2,807,235
ALL WEATHER FEEDER FOR ANIMALS

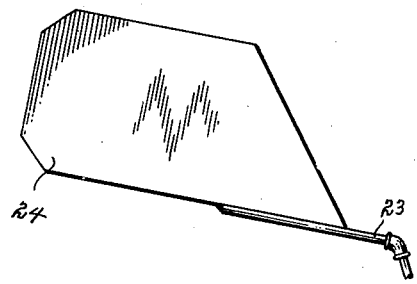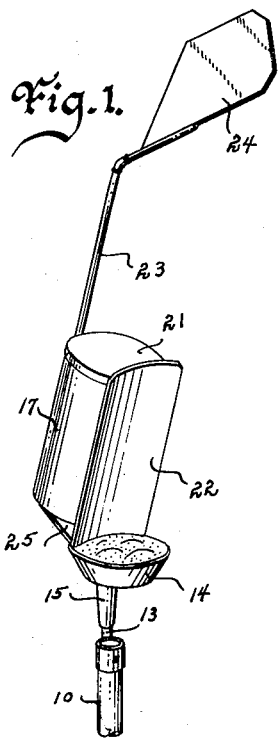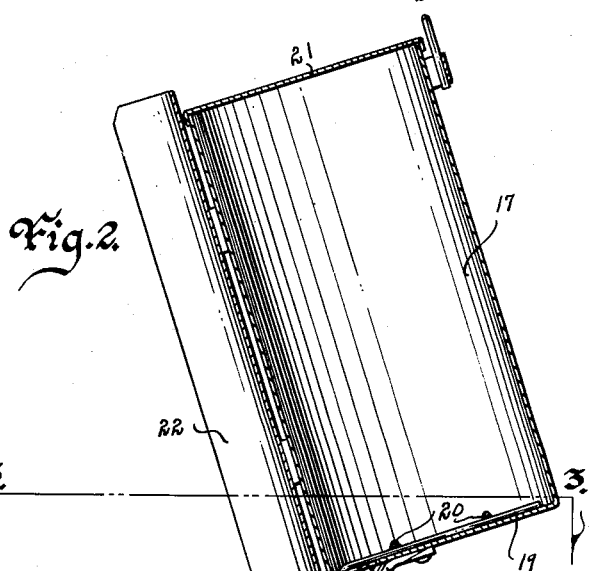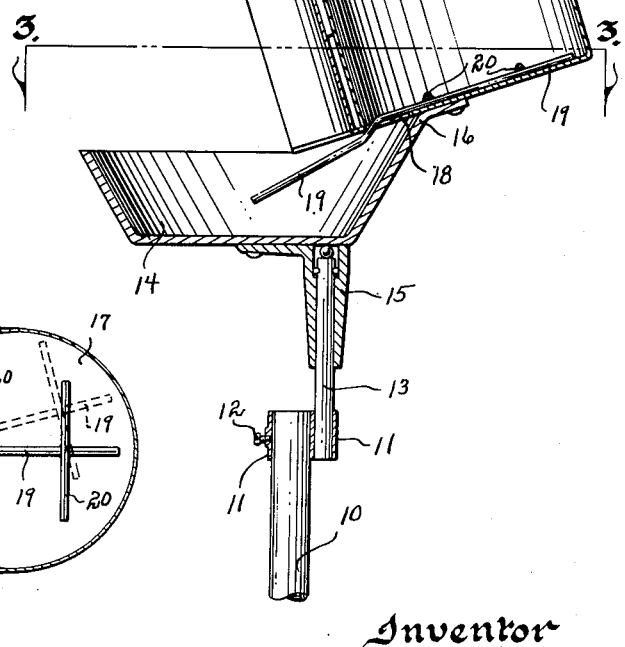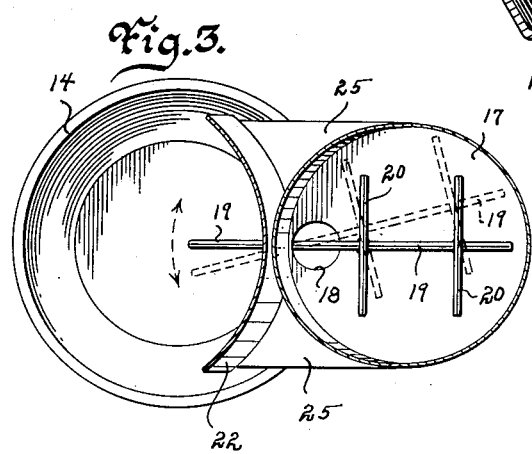

Alfred J. Piel, Hubbard, Iowa

Application October 23, 1956, Serial No. 617,793

6 Claims. (Cl. 119—52)

This invention relates to feeders and more particularly to one for all weather usage in dispensing salts, feed, mineral food supplements and like to livestock.

The successful raising of farm animals requires adequate feeding facilities. The usual method is the employment of troughs into which the feed is periodically placed by the one caring for the stock. Such trough means, however, has many objections. By being open the feed is subject to damage from the rain, snow, wind and like hazards of the elements. Also frequent servicing by the stock raiser is necessary. Furthermore, troughs are unsanitary and provide a scratching member for animals which often results in the upsetting of the entire feeding means.

Therefore, one of the principal objects of my invention is to provide an animal feeder that protects the feed being dispensed from the elements.

A further object of this invention is to provide a self service strong animal feeder.

A still further object of my invention is to provide an animal feeder that is rotated by the wind for maintaining the eating bowl portion and feeding means in a position opposite from the direction of the wind.

A still further object of this invention is to provide a feed dispenser for animal use that cannot be upset nor damaged by the animals using the same.

A still further object of this invention is to provide an animal feeder that has a food supply source actuated by the animal.

Still further objects of my invention are to provide an animal feeder that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings in which:

Fig. 1 is a perspective view of my device ready for use,

Fig. 2 is an enlarged vertical sectional view of the device and more fully illustrates its construction, and Fig. 3 is an enlarged cross sectional view of the feeder taken on line 3—3 of Fig. 2.

While I have indicated my feeder primarily for livestock use, it may be used for feeding fowls, or birds, both domestic or wild.

In the drawings I have used the numeral 10 to designate a vertical metal pipe post. The lower end portion of this post is adapted to be embedded permanently in the ground (not shown). The height of the post above the ground will be in ratio to the height of the animal to be fed. The numeral 11 designates a detachable bearing slidably adjustable on the post 10 and capable of being rigidly secured thereto by the set screw 12. This bearing 11 has a vertical shaft 13. The numeral 14 designates the feeding bowl. On the bottom of this bowl is a vertical bearing 15 held onto the upper portion of the shaft 13, but permitted horizontal rotation. This bearing 15 is positioned off center on the bowl, as shown in Fig. 2. On the side of the bowl adjacent the bearing 15 is an extension portion of the wall rim of the bowl designated by the numeral 16. This portion 16 has its top edge extending upwardly and outwardly, as shown in Fig. 3. The numeral 17 designates the material supply tank having its bottom secured to the rim portion 16 by any suitable means, such as rivets, bolts, or like. Due to the slope or angle of the portion 16 to the horizontal, this tank or container 17 will extend upwardly at an angle to the vertical and above the bowl as shown. The bottom portion of the supply tank only partially extends over the bowl 14 with the balance of its bottom extending laterally beyond the circumference of the bowl. The numeral 18 designates a hole in the bottom of the tank 17 and positioned to directly communicate with the inside top of the bowl adjacent the portion 16. By this construction substantially the entire top area of the bowl is unobstructed for animal feeding purposes. The material to be fed the animal is placed in the supply tank 17 and as needed passes through the hole opening 18 and thence into the rear end area of the bowl. When this end area of the bowl is filled, the material will close the opening 18 and prevent any more material to enter the feeding bowl until the material therein has been consumed. However, most materials have a tendency to clog or pack and I have provided an animal actuated agitator. This agitator comprises a rod 19 extending along the inside bottom of the tank, thence bent downwardly and forwardly to extend through the hole 18, and thence into the feeding area of the bowl by extending forwardly and downwardly therein, as shown in Fig. 3. The numeral 20 designates transverse cross bars on the rod 19 and inside the supply tank. If material is not forthcoming through the hole 18, the animal will automatically nose or move the free forward end of the rod 19, thereby agitating the material in the supply tank and hole 18 and causing it to flow into the feeding bowl. This agitating unit may be pivoted to the tank or placed loose in the tank, as the hole 18 will hold it in place. The numeral 21 designates a detachable lid on the tank 17. The numeral 22 designates a curved windshield on the eating side of the tank 17. This shield is the full length of the tank and curved toward the feeding bowl, as shown in Fig. 1, and has the same degree of arc to conform with the circular feeding bowl so as to direct wind, rain, snow, dust and like, from contacting the feeding material in the bowl. The numeral 23 designates a rod secured to the top side of the tank opposite from the shield 22. This rod extends up and over the tank to hold a weather vane 24 beyond the vertical plane of the feeding bowl. This vane 24 will turn the unit by wind action so that the back of the shield 22 will always be toward the wind direction. Also the shield 22 aids in causing the device to turn with the wind. When in such position the feeding bowl and its contents will be protected from the elements. The shield 22 may be strengthened in its position by webbing 25.

From the foregoing it will be seen that I have provided a self serving animal feeder and one that protects the feeding material from the weather.

Some changes may be made in the construction and arrangement of my all weather feeder for animals without departing from the real spirit and purpose of my invention and it is my intention to cover by my claims, any modified forms of structure or use of mechanical equivalents which may be reasonably included within their scope.

I claim:

1. In an animal feeder, a post, a feeding bowl operatively rotatably secured to said post, a material supply tank secured to said feeding bowl with a portion of its bottom extending over said bowl and having a hole in its bottom communicating with the top area of said bowl, a weather vane operatively secured to said tank, a rod extending from the inside of said supply tank through said hole and into said bowl, and at least one cross bar on said rod and inside said tank; said bowl at the rim area where it engages said tank being sloped upwardly and laterally for supporting said tank in a canted condition.

2. In an animal feeder, a post, a feeding bowl operatively rotatably secured to said post, a material supply tank positioned at an angle to the vertical secured to said feeding bowl with a portion of its bottom extending over said bowl and having a hole in substantially the lowest area of its bottom communicating with the top area of said bowl, and a weather vane operatively secured to said tank.

3. In an animal feeder, a post, a feeding bowl operatively rotatably secured to said post, a material supply tank secured to said feeding bowl with a portion of its bottom extending over said bowl and having a hole in its bottom communicating with the top area of said bowl, a weather vane operatively secured to said tank, a rod extending from the inside of said supply tank loosely through said hole and into said bowl, and at least one cross bar on said rod and inside said tank, said rod capable of horizontal swinging motion relating to said hole.

4. In an animal feeder, a post, a feeding bowl operatively rotatably secured to said post, a material supply tank secured to said feeding bowl with a portion of its bottom extending over said bowl, a portion of its bottom extending beyond said bowl and having a hole in its bottom communicating with the top area of said bowl, a weather vane operatively secured to said tank, and a curved weather shield secured to that side of said tank that is closest to said bowl and having its curvature extending toward and over at least a portion of said bowl.

5. In an animal feeder, a post, a feeding bowl operatively rotatably secured to said post, a material supply tank secured to said feeding bowl with a portion of its bottom extending over said bowl, a portion of its bottom extending beyond said bowl and having a hole in its bottom communicating with the top area of said bowl, and a curved weather shield secured to that side of said tank that is closest to said bowl and having its curvature extending toward and over at least a portion of said bowl; said shield acting as a weather vane for holding said bowl in a trailing position in from that of the direction of the wind.

6. In an animal feeder, a post, a feeding bowl operatively rotatably secured to said post, a material supply tank secured to said feeding bowl with a portion of its bottom extending over said bowl and having a hole in its bottom communicating with the top area of said bowl, a weather vane operatively secured to said tank, and a curved weather shield secured to the side of said tank and over at least a portion of said bowl and curved in the direction of said bowl and away from said tank; said weather vane orienting said feeder relative to the wind that the outside curvature of said shield will extend in the direction from which the wind is coming.

References Cited in the file of this patent

UNITED STATES PATENTS

| | | |
|---|---|---|
| 2,230,058 | Hornung | Jan. 28, 1941 |
| 2,445,165 | Carmo | July 13, 1948 |
| 2,656,819 | Meier | Oct. 27, 1953 |
| 2,691,958 | Lage | Oct. 19, 1954 |

FOREIGN PATENTS

| | | |
|---|---|---|
| 21,486 | Great Britain | 1895 |
| 497,160 | Germany | May 3, 1930 |